US008511434B2

(12) United States Patent
Blomberg (10) Patent No.: US 8,511,434 B2
(45) Date of Patent: Aug. 20, 2013

(54) FALL PROTECTION SAFETY DEVICE WITH A BRAKING MECHANISM

(75) Inventor: John P. Blomberg, Red Wing, MN (US)

(73) Assignee: D B Industries, LLC, Red Wing, MN (US)

( * ) Notice: Subject to any disclaimer, the term of this patent is extended or adjusted under 35 U.S.C. 154(b) by 200 days.

(21) Appl. No.: 12/977,526

(22) Filed: Dec. 23, 2010

(65) Prior Publication Data
US 2011/0147125 A1 Jun. 23, 2011

Related U.S. Application Data

(60) Provisional application No. 61/289,550, filed on Dec. 23, 2009.

(51) Int. Cl.
*A62B 1/20* (2006.01)
(52) U.S. Cl.
USPC .............. 182/189; 182/36; 182/100; 182/187
(58) Field of Classification Search
USPC ........................ 182/36, 37, 48, 100, 187, 189
See application file for complete search history.

(56) References Cited

U.S. PATENT DOCUMENTS

| | | | | |
|---|---|---|---|---|
| 5,483,849 | A | | 1/1996 | Orii et al. |
| 6,293,376 | B1 | * | 9/2001 | Pribonic ........................ 188/165 |
| 6,397,974 | B1 | * | 6/2002 | Adifon et al. .................. 187/254 |
| 6,830,126 | B2 | * | 12/2004 | Godwin ............................ 182/82 |
| 7,096,996 | B2 | * | 8/2006 | Korchagin et al. .............. 182/82 |
| 7,588,127 | B2 | * | 9/2009 | Shiratsuki et al. ............. 187/391 |
| 2008/0223666 | A1 | * | 9/2008 | Cuthbert ........................ 187/288 |
| 2009/0159373 | A1 | | 6/2009 | Hartman et al. |
| 2009/0249712 | A1 | * | 10/2009 | Brickell et al. .............. 52/173.1 |
| 2010/0224448 | A1 | | 9/2010 | Wolner et al. |
| 2010/0226748 | A1 | | 9/2010 | Wolner et al. |
| 2011/0061971 | A1 | * | 3/2011 | Monkl et al. ....................... 182/3 |
| 2011/0203871 | A1 | * | 8/2011 | Faye et al. .......................... 182/3 |

FOREIGN PATENT DOCUMENTS

GB 2 140 978 A 12/1984
WO WO 2009/108040 A1 9/2009

OTHER PUBLICATIONS

International Search Report from Application Serial No. PCT/US2010/062007 mailed May 9, 2011.
International Search Report for PCT/US2010/062007.
DBI SALA, Sealed-Blok™ RSQ™ Self Retracting Lifeline RSQ™ Controlled Descent Instruction Supplement, Form: 5903061 Rev:A, 2010, 8 pages.
DBI SALA, Supplemental User Instruction Manual Ultra-Lok RSQ Controlled Descent SRLS, Form: 5902411 Rev: A, 2009, 36 pages.

(Continued)

*Primary Examiner* — Alvin Chin Shue
*Assistant Examiner* — Colleen M Chavchavadze
(74) *Attorney, Agent, or Firm* — IPLM Group, P.A.

(57) ABSTRACT

A fall protection safety device including a braking mechanism comprises a first component, a second component configured and arranged to move relative to the first component, and at least one magnet operatively connected to one of the components and another of the components being at least partially made of a non-ferromagnetic and electrically conductive material. The at least one magnet and the non-ferromagnetic and electrically conductive material creating an electromagnetic field force when the second component moves at a rate greater than a predetermined rate relative to the first component.

6 Claims, 7 Drawing Sheets

(56) References Cited

OTHER PUBLICATIONS

DBI SALA, User Instruction Manual Rollgliss® R500 Rescue & Escape Device, Form: 5902448 Rev: A, 2009, 16 pages.
DBI SALA, User Instruction Manual Sealed-Blok™ Self Retracting Lifelines, Form: 5903059 Rev: A, 2010, 16 pages.
Exploratorium Science Snacks, Eddy Currents [online] [retrieved Dec. 20, 2009] retrieved from the internet: <http://www.exploratorium.edu/snacks/eddy_currents/index.html>, 2 pages.
Lenz's law, Wikipedia, the free encyclopedia [online] [retrieved Dec. 20, 2009] retrieved from the internet: <http://en.wikipedia.org/wiki/Lenz's_law>, 2 pages.

* cited by examiner

FALL PROTECTION SAFETY DEVICE WITH A BRAKING MECHANISM

This application claims the benefit of U.S. Provisional Patent Application Ser. No. 61/289,550, filed Dec. 23, 2009.

FIELD OF THE INVENTION

The present invention relates to a fall protection safety device including a braking mechanism.

BACKGROUND

Fall protection safety devices are well known in the art of fall protection safety equipment for use by workers performing tasks during which there is a risk a fall may occur.

One type of safety device commonly used is a rail along the length of which a shuttle moves. The rail is typically connected to a support structure within the vicinity the worker is performing the task, and the shuttle is typically connected to a safety harness worn by the worker. An energy absorber may also be used with this type of safety device to reduce the amount of force transferred to the worker. Should a fall occur, the shuttle locks onto the rail thereby preventing the worker from falling any further. If the shuttle becomes contaminated with dirt, oil, grease, water, ice, or other types of debris or contaminants, the shuttle may not operate properly. One type of commonly used shuttle utilizes a wheel that rides on a rail or track to sense speed, and the wheel could be affected by contaminants. If the wheel has a rubber grip, the rubber grip could be degraded by ultraviolet light or ozone exposure.

Another type of safety device commonly used is a self-retracting lifeline. A self-retracting lifeline generally includes a housing containing a drum around which a cable, rope, webbing, or other suitable lifeline is wound. The drum is spring biased to pay out cable as tension pulling the cable is applied and to retract any of the cable that has been unwound from the drum as the tension on the cable is reduced or released. The housing also includes a brake assembly for stopping rotation of the drum when the cable suddenly unwinds from the drum at a rate greater than a predetermined maximum angular velocity. A self-retracting lifeline is typically connected to a support structure within the vicinity the worker is performing the task, and the end of the cable is typically connected to a safety harness worn by the worker. The support structure may include one or more structures. The cable is easily drawn out of the self-retracting lifeline housing as the worker moves away from the device, and the cable is automatically drawn back into the housing as the worker moves toward the device. Should a fall occur, the brake assembly within the device is automatically engaged by a centrifugal clutch assembly, which gradually and quickly stops the worker's fall by gradually and quickly stopping the rotation of the drum. As the rotation of the drum is stopped, additional cable is prevented from being paid out of the housing to stop the fall of the worker. Some self-retracting lifelines are sealed to prevent contaminants from interfering with the braking or locking mechanism.

Another type of safety device commonly used is a descender or a controlled descent device, which generally include a braking mechanism to allow the worker to slowly descend to a safe location.

For the reasons stated above and for other reasons stated below, which will become apparent to those skilled in the art upon reading and understanding the present specification, there is a need in the art for a shuttle for use with a fall protection assembly that is less prone to contaminants interfering with its operation.

SUMMARY

The above-mentioned problems associated with prior devices are addressed by embodiments of the present invention and will be understood by reading and understanding the present specification. The following summary is made by way of example and not by way of limitation. It is merely provided to aid the reader in understanding some of the aspects of the invention.

In one embodiment, a fall protection safety device including a braking mechanism comprises a first component, a second component configured and arranged to move relative to the first component, and at least one magnet operatively connected to one of the components and another of the components being at least partially made of a non-ferromagnetic and electrically conductive material. The at least one magnet and the non-ferromagnetic and electrically conductive material creating an electromagnetic field force when the second component moves at a rate greater than a predetermined rate relative to the first component.

In one embodiment, a fall protection safety device including a braking mechanism comprises a housing, a pawl, and a magnet. The housing is configured and arranged to move along a support structure being from the group consisting of a rail, a track, and a cable and being made of a non-ferromagnetic and electrically conductive material. The pawl is pivotally connected to the housing and is configured and arranged to move from a disengaged position into an engaged position when the housing moves along the support structure at a rate greater than a predetermined rate to lock the housing onto the support structure. The magnet is operatively connected to the pawl such that when the housing moves at an increased rate repulsive forces between the magnet and the support structure assist in moving the pawl from the disengaged position into the engaged position.

In one embodiment, a fall protection safety device comprises a housing, a drum, at least one magnet, and a lifeline. The drum is rotatably operatively connected to the housing and rotates in a first direction and a second direction. The at least one magnet is operatively connected to one of the housing and the drum, and another of the housing and the drum is at least partially made of a non-ferromagnetic and electrically conductive material. The lifeline is operatively connected to the drum. The intermediate portion of the lifeline is at least partially wound about the drum and the second end extends outward from the housing. The lifeline is paid out from the housing when sufficient tension is placed on the lifeline thereby rotating the drum. A repulsion force between the at least one magnet and the non-ferromagnetic and electrically conductive material reduces a rate at which the drum rotates in at least one of the first direction and the second direction.

BRIEF DESCRIPTION OF THE DRAWINGS

The present invention can be more easily understood, and further advantages and uses thereof can be more readily apparent, when considered in view of the detailed description and the following Figures in which.

In accordance with common practice, the various described features are not drawn to scale but are drawn to emphasize specific features relevant to the present invention. Reference characters denote like elements throughout the Figures and the text.

DETAILED DESCRIPTION OF A PREFERRED EMBODIMENT

In the following detailed description, reference is made to the accompanying drawings, which form a part hereof, and in which is shown by way of illustration embodiments in which the inventions may be practiced. These embodiments are described in sufficient detail to enable those skilled in the art to practice the invention, and it is to be understood that other embodiments may be utilized and mechanical changes may be made without departing from the spirit and scope of the present invention. The following detailed description is, therefore, not to be taken in a limiting sense, and the scope of the present invention is defined only by the claims and equivalents thereof.

The present invention generally relates to a braking mechanism for use with a fall protection safety device. The braking mechanism could act as a brake, a lock, and/or a trigger mechanism suitable for the type of fall protection safety device.

One type of fall protection safety device with which the present invention could be used is a shuttle. An embodiment shuttle constructed according to the principles of the present invention is designated by the numeral 100 in the drawings.

Figure 3:
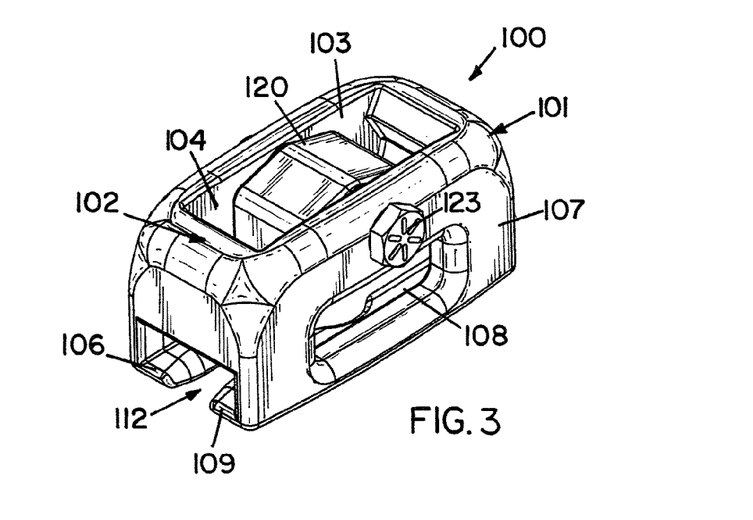
FIG. 3 is a top perspective view of the shuttle shown in FIG. 2.

The shuttle 100 includes a housing 101 and a pawl 120. As shown in the orientation shown in FIG. 3, the housing 101 includes a front 102 from which a first side 104 and a second side 107 extend downward. The front 102 has an opening 103 proximate the center of the front 102, the first side 104 has an opening 105 proximate the center of the first side 104, and the second side 107 has an opening 108 proximate the center of the second side 107. The first side 104 also includes an aperture (not shown) between the opening 105 and the front 102, and the second side 107 also includes an aperture (not shown) between the opening 108 and the front 102. A flange 106 extends inward from the bottom of the first side 104, and a flange 109 extends inward from the bottom of the second side 107. As shown in the orientation shown in FIG. 4, the housing 101 also includes a top 110 and a bottom 112. The area between the front 102 and the flanges 106 and 109 form a channel 112 extending from the top 110 to the bottom 111.

Figure 1:
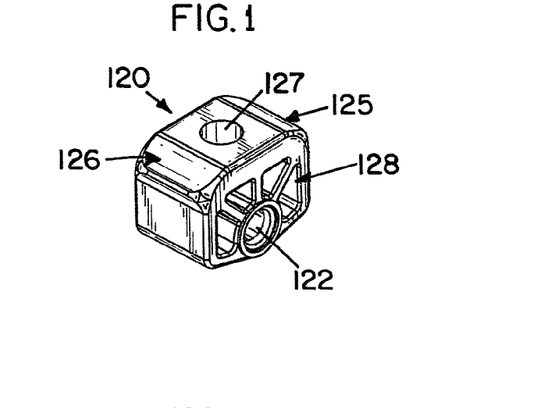
FIG. 1 is a side perspective view of a pawl of a shuttle constructed according to the principles of the present invention.
Figure 2:
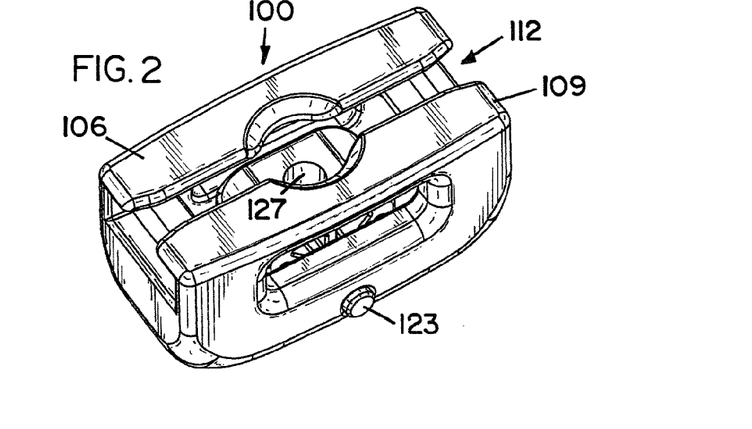
FIG. 2 is a bottom perspective view of a shuttle constructed according to the principles of the present invention including the pawl shown in FIG. 1.

The pawl 120 includes sides 128 interconnecting a front 121 and a rear 124. The rear 124 includes a first surface 125 proximate the top and a second surface 126 proximate the bottom. The surfaces 125 and 126 are approximately spiral-shaped, preferably a logarithmic spiral, and are symmetric about a plane passing through the theoretical axis of bore 122 and perpendicular to the face of the magnet 127. The rear 124 includes a magnet 127, which is preferably embedded into the pawl 120. A bore 122 extends laterally through the sides 128, and a fastener 123 extends through the apertures in the sides 104 and 107 of the housing 101 and the bore 122 of the pawl 120 to interconnect the housing 101 and the pawl 120.

Figure 4:
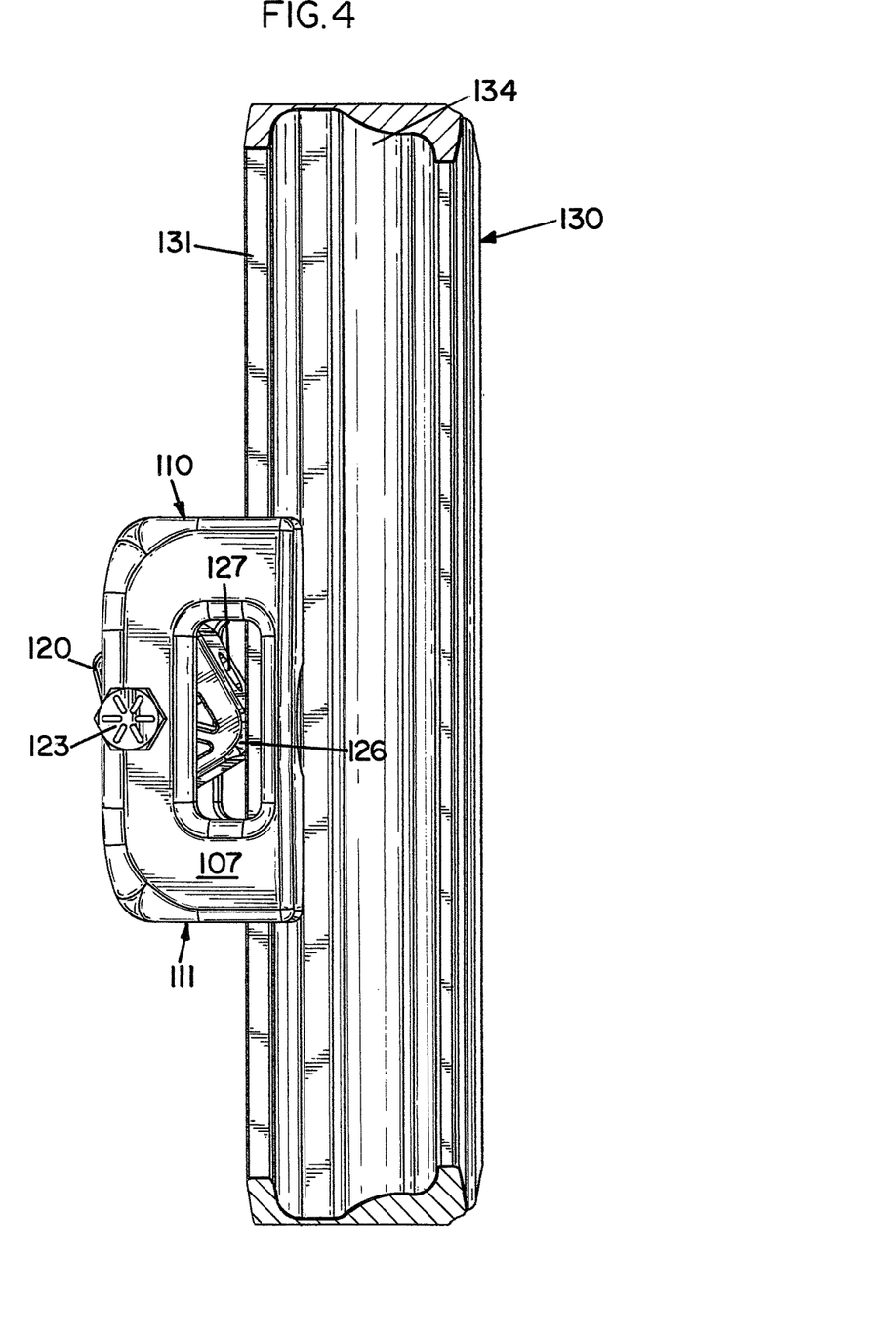
FIG. 4 is a side view of the shuttle shown in FIG. 2 operatively connected to a rail in a locked position.
Figure 5:
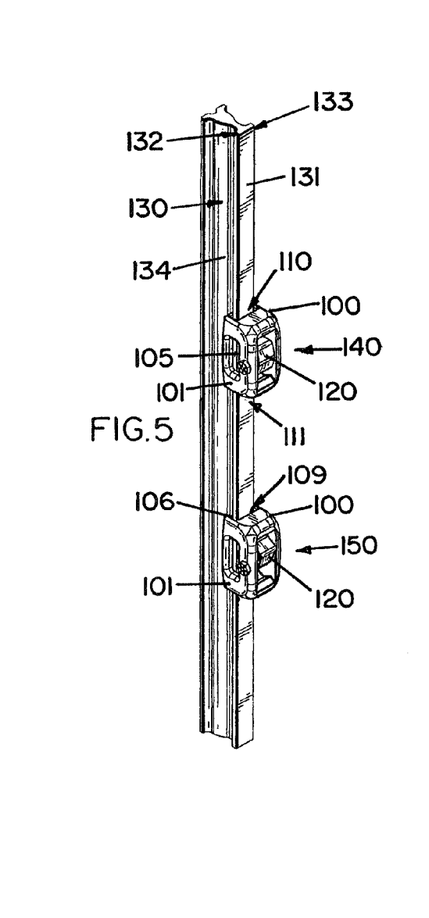
FIG. 5 is a side perspective view of a first shuttle and a second shuttle operatively connected to a rail.
Figure 6:
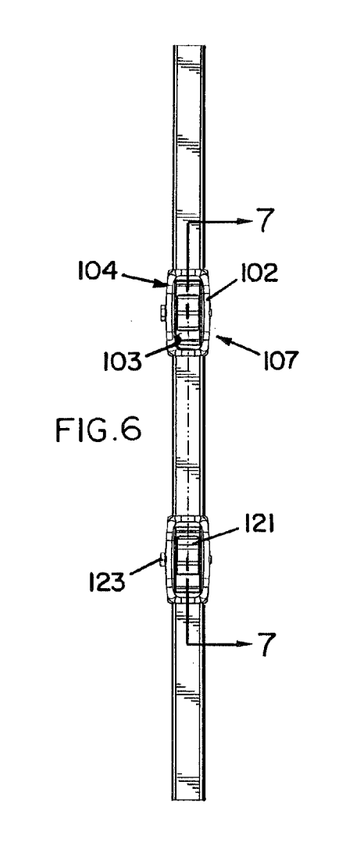
FIG. 6 is a front view of the first and second shuttles shown in FIG. 5 operatively connected to a rail.

The shuttle 100 is configured and arranged to slide along the length of a rail 130, which is preferably made of aluminum, copper, brass, stainless steel, or any other suitable electrically conductive metal with insignificant static magnetic field attraction force. The rail 130 includes a flange 131 extending outward from a base 134. The flange 131 has a first side 132 and a second side 133. The base 134 includes apertures for attaching the base 134 to a support structure.

Figure 7:
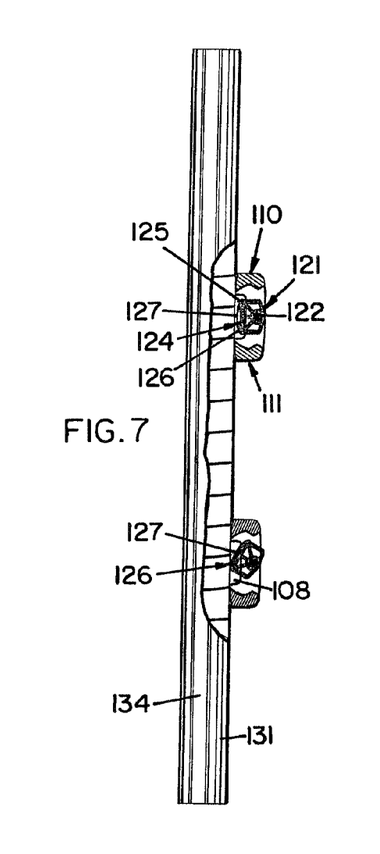
FIG. 7 is a side cross-section view of the first and second shuttles taken along the lines 7-7 in FIG. 6, the first shuttle being in an unlocked position and the second shuttle being in a locked position.

As the shuttle 100 moves along the length of the rail 130, should the shuttle move at a speed greater than a predetermined speed, such as during a fall, the pawl 120 will pivot from a disengaged or unlocked position 140 to an engaged or locked position 150 and prevent further movement of the shuttle 100 along the rail 130. The magnet 127 in the pawl 120 generates a force, a changing magnetic field that pushes electrons around in a circular, eddy current, and in the orientation shown in FIG. 7, downward movement along the rail 130 at a speed greater than a predetermined speed makes the magnet 127 want to move upward. This is in accordance with Lenz's Law. Preferably, the magnet 127 is positioned in an orientation such that the magnetic field is concentrated proximate the rail, and north or south polarity of the magnet 127 does not matter. The surfaces 125 and 126 of the pawl 120 are angled so that when the pawl 120 pivots in a first or second direction, the corresponding surface is configured and arranged to engage the rail 130 to which the shuttle 100 is connected. In the orientation shown in FIG. 7, the second surface 126 is an engaging surface when the shuttle is moved in a downward direction to engage the rail 130 and prevent a worker from falling. Thus, in this embodiment, the braking mechanism acts as a lock because the pawl pivots to engage the rail and prevent the shuttle from moving further along the rail.

When the magnet is moved in relation to the rail, the eddy currents create a force in opposition to the direction the magnet is moving. This repulsive force is used to trigger or engage the braking mechanism. Since the magnet does not contact the rail, the magnet is not affected by contaminants on the rail. Thus, the magnet reduces the likelihood that contaminants will interfere with the operation of the braking mechanism. Since one type of commonly used shuttle utilizes a wheel that compresses against the rail to sense speed, the shuttle of the present invention is easier for a user to move along the length of a rail, track, or cable.

Although a vertical rail is shown and disclosed, it is recognized that the shuttle could be used with a vertical rail, a horizontal rail, a sloped rail, or any other suitable anchorage member. In addition, a track or a cable could be used in lieu of a rail.

There are various agency test requirements (ANSI, CE, CSA, etc.) that require a shuttle or sleeve to lock within a certain distance. Generally, this is in the range of approximately 6 inches. The locking speed or distance is adjustable in this design.

The forces that the locking feature must withstand are specific to the various agency test requirements (ANSI, CE, CSA, etc.) but are generally in the range of 3,600 to 5,000 pounds. In this embodiment, the magnet would not necessarily need to hold this strength since its main purpose is to trigger the braking mechanism.

The magnet in the braking feature is used as a speed sensor to trigger the braking mechanism. During normal use, the braking mechanism is in a disengaged position. Should a fall occur, the speed of the shuttle will increase and this will result in large enough eddy currents (repulsive forces) to trigger the braking mechanism.

Depending upon the application, a spring, gravity, a detent, or other suitable mechanisms could be used to keep the braking mechanism disengaged. How the device is held in the disengaged position affects the invention. For instance, more speed would be needed to overcome a large spring than a small spring biasing force for the same magnet and braking configuration. This can be accounted for by adjusting the height of the magnet above the track or cable, the strength of the magnet, and/or the design of the triggering mechanism.

Given the wide nature of this invention, many configurations could be used such as, but not limited to, various types and geometries of magnets; spacing between the magnet and the rail, track, or cable; various types of braking, locking, or triggering mechanisms; and rail, track, or cable geometry variations.

Other types of fall protection safety devices with which the present invention could be used are self-retracting lifelines and descenders or controlled descent devices. Generally, an electromagnetic field ("EMF") force could be used to at least enhance the braking mechanism or act as the braking mechanism of self-retracting lifelines and descenders or controlled descent devices.

The housings of the self-retracting lifelines and descenders are preferably at least partially made from a non-ferromagnetic, electrically conductive material such as, but not limited to, aluminum, and magnets are mounted on cylindrical or other axis-symmetric shapes that spin relative to the housings. The magnets spin because they are mechanically connected through gearing and drums to lifelines. The faster the magnets spin, the larger the EMF forces are exerted on them in the opposite direction they are spinning. Since the force is in the opposite direction to the movement of the magnets, a braking force is applied to the magnets. This braking force is transmitted through the gearing and the drums to the lifelines and is dissipated as heat. The magnets do not contact the housings and, thus, do not wear out as conventional braking mechanisms.

Figure 8:
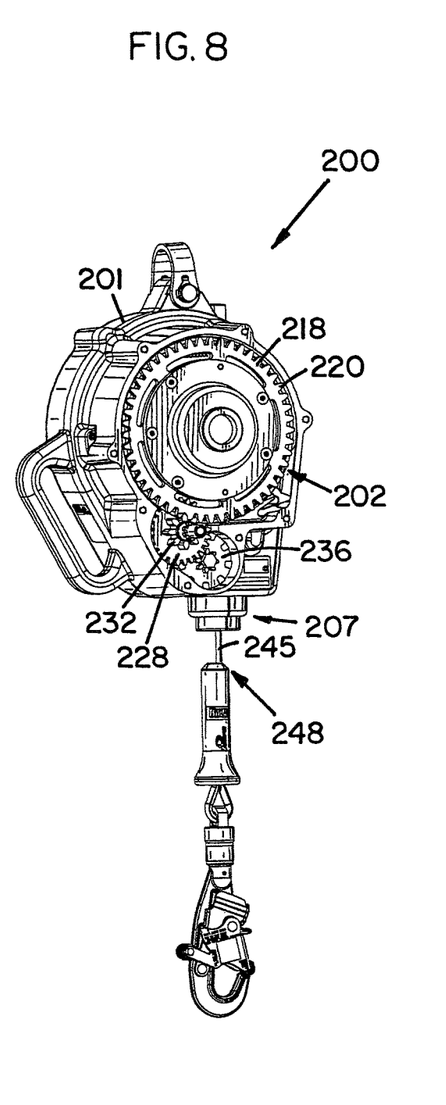
FIG. 8 is a side perspective view of a self-retracting lifeline constructed according to the principles of the present invention with a cover removed.
Figure 9:
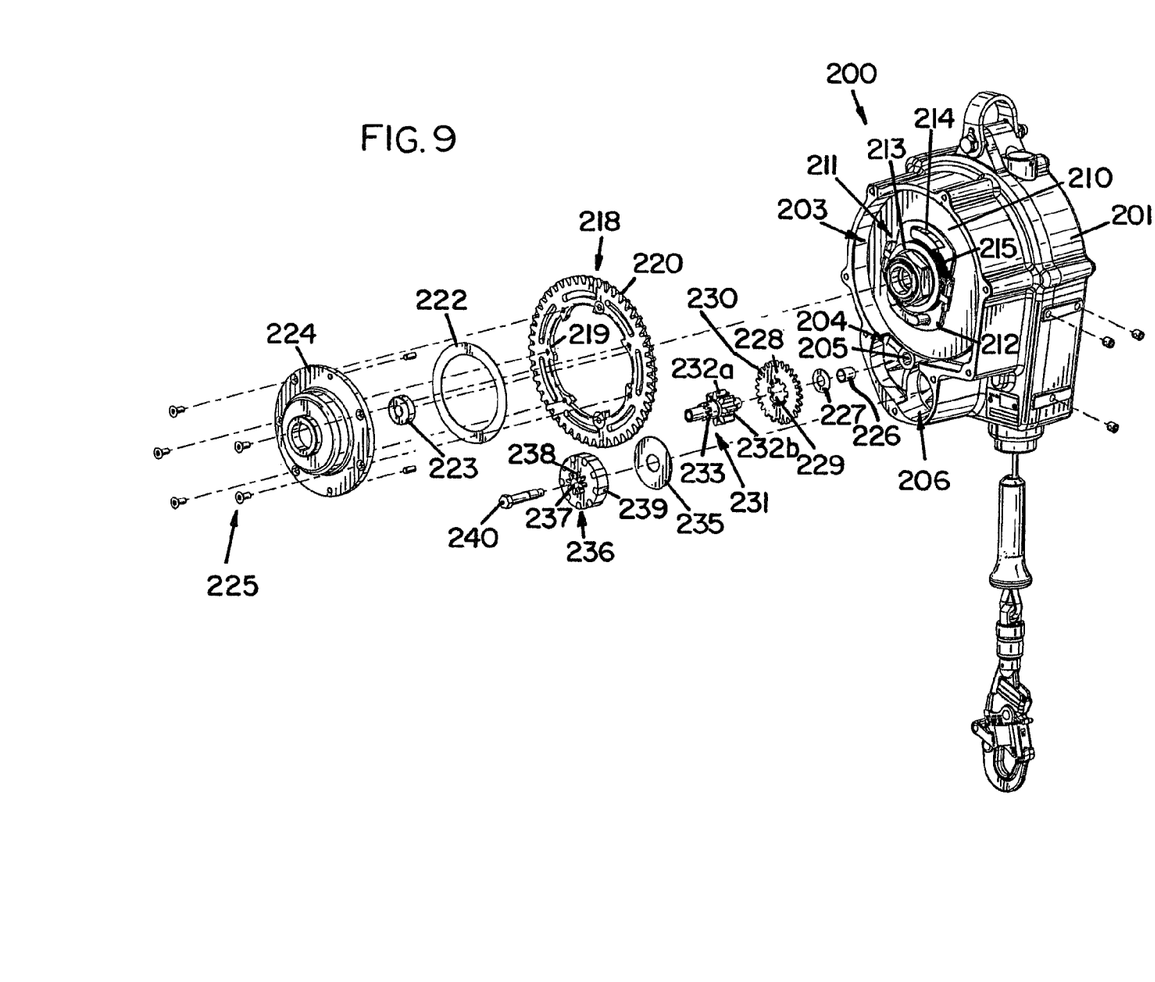
FIG. 9 is a partially exploded side perspective view of the self-retracting lifeline shown in FIG. 8.

An embodiment self-retracting lifeline constructed according to the principles of the present invention is designated by the numeral 200 in FIGS. 8 and 9.

Although one type of self-retracting lifeline is shown and described herein for use with the present invention, it is recognized that any suitable self-retracting lifeline could be used. Because self-retracting lifelines suitable for use with the present invention are well-known, only the components of the self-retracting lifeline 200 relevant to the description of the present invention are being described herein.

The self-retracting lifeline 200 includes a housing 201 defining a cavity 202 having a first compartment 203, a second compartment 204, and a third compartment 206. A bore 205 extends at least partially through the housing 201 proximate a middle portion of the second compartment 204. The housing 201 also includes a cable exit 207.

A drum 210, around which a lifeline 245 is wound, is rotatably connected to the housing 201 and fits within the first compartment 203. The lifeline 245 includes a first end (not shown) operatively connected to the drum 210, an intermediate portion (not shown) wound about the drum 210, and a second end 248 extending through the cable exit 207 of the housing 201. A brake mechanism 211 is operatively connected to the drum 210.

The brake mechanism 211 includes several components in each of the three compartments. In the first compartment 203, a base plate 212 is operatively connected to the drum 210, and brake discs 213 and pawls 214 biased with springs 215 are operatively connected to the base plate 212. A gear 218 fits within the first compartment 203 proximate the base plate 212 and includes inner teeth 219 and outer teeth 220. A bushing 223 fits within a bore (not shown) of the drum 210 to assist in rotation of the drum 210 about a shaft (not shown). A cover 224 is operatively connected to the gear 218 with fasteners 225. An isolation disc 222 reduces the friction between the pawls 214 and the cover 224.

Figure 9A:
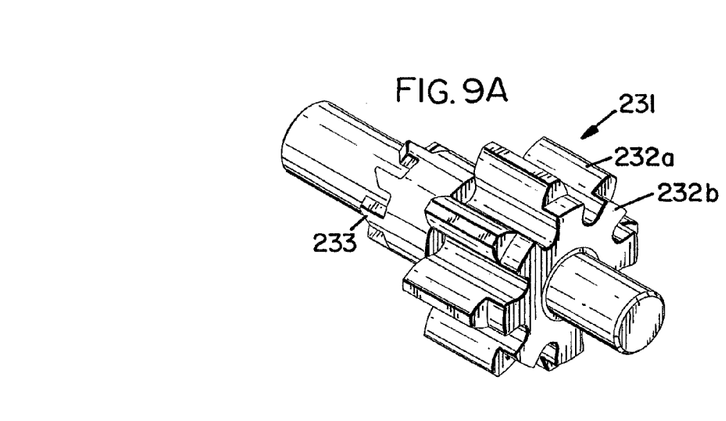
FIG. 9A is perspective rear view of a shaft of the self-retracting lifeline shown in FIG. 9.

In the second compartment 204, a bushing 226 fits within the bore 205 and a spacer 227 and a gear 228 fit about the bore 205. The gear 228 includes inner teeth 229 and outer teeth 230. A shaft 231 includes teeth 232a, teeth 232b, and teeth 233 extending outward therefrom proximate an intermediate portion of the shaft 231. The teeth are shown in FIG. 9A. One end of the shaft 231 extends into the bushing 226 within the bore 205, the teeth 232a mate with the outer teeth 220 of the gear 218, the teeth 232b mate with the inner teeth 229 of the gear 228, and the teeth 233 selectively mate with a mode control assembly (not shown) such as that disclosed in U.S. Patent Application Publication Nos. 2010/0226748A1 and 2010/0224448A1.

In the third compartment 206, a disc 235 is positioned proximate the housing and a cylinder 236 is positioned within the third compartment 206. The cylinder 236 includes a bore 237 and teeth 238 positioned about the bore 237. The teeth 238 mate with the outer teeth 230 of the gear 228. Magnets 239 are operatively connected to the cylinder 236, preferably proximate the cylinder's perimeter. A fastener 240 extends through the bore 237 and through a bore (not shown) in the housing to rotatably connect the cylinder 236 to the housing 201. The disc 235 is used to reduce friction as the cylinder 236 rotates.

In this particular embodiment, the brake discs 213 are not used to arrest a fall. This self-retracting lifeline is shown and described in rescue or descending mode but can be switched to a standard self-retracting lifeline fall arrest mode. The standard self-retracting lifeline fall arrest mode uses the brake discs to arrest a fall. This type of self-retracting lifeline is known in the art. Examples of this type of self-retracting lifeline are the SEALED-BLOK RSQ and the ULTRA-LOK RSQ by D B Industries, Inc. d/b/a Capital Safety USA of Red Wing, Minn. Other examples of this type of self-retracting lifeline are disclosed in U.S. Patent Application Publication Nos. 2010/0226748A1 and 2010/0224448A1.

In the rescue or decent mode, the speed at which the drum 210 rotates is great enough to overcome the biasing force of the springs 215 so that the pawls 214 pivot outward from a disengaged position into an engaged position and at least one of the pawls 214 engages the inner teeth 219 of the gear 218. The gear 218 rotates, which causes the shaft 231 to rotate, which causes the gear 228 to rotate, which causes the cylinder 236 to rotate. As the cylinder 236 rotates, the magnets 239 move relative to the housing 201 and the EMF forces exert a braking force on the drum 210. The braking force due to the EMF force generated between the magnets 239 and the housing 201 increases as the rotational velocity increases.

Figure 10:
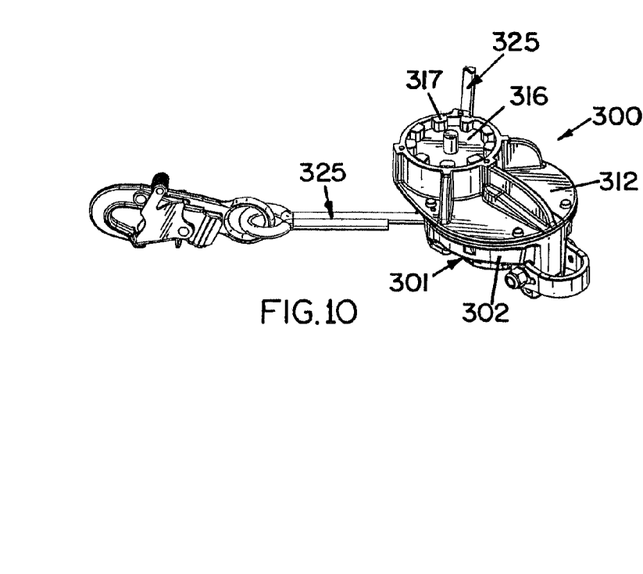
FIG. 10 is a perspective view of a descender constructed according to the principles of the present invention with a cover removed.
Figure 11:
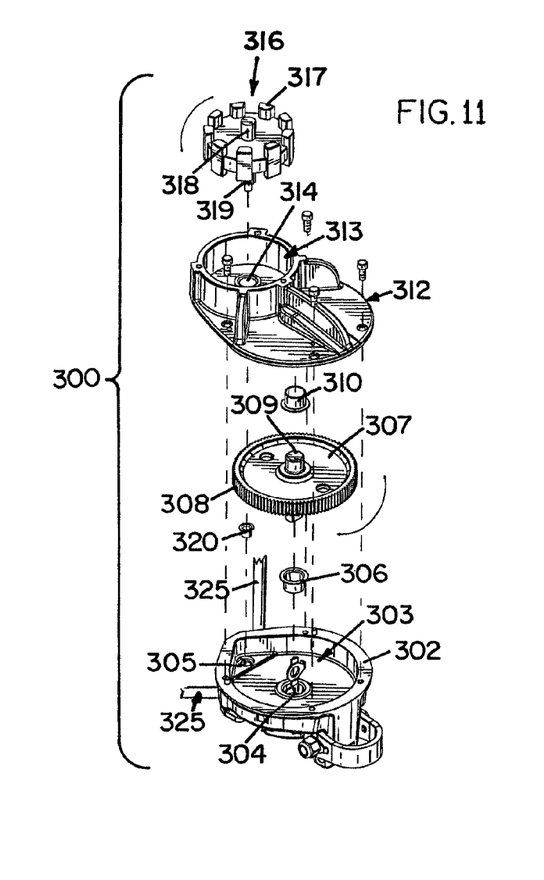
FIG. 11 is an exploded perspective view of the descender shown in FIG. 10.

An embodiment descender constructed according to the principles of the present invention is designated by the numeral 300 in FIGS. 10 and 11.

One type of descender that could be used with the present invention is the ROLLGLISS™ R500 descender. Although one type of descender is shown and described herein for use with the present invention, it is recognized that any suitable descender could be used.

The descender 300 includes a housing 301 with a base 302 and a cover 312. The base 302 defines a cavity 303 and includes a bore 304 proximate the center and a bore 305 proximate the bottom. A drum 307 is configured and arranged to fit within the cavity 303 and includes teeth 308 around its perimeter and a shaft 309 extending outward from each side. A bushing 306 fits within the bore 304 and a bushing 310 fits within a bore (not shown) in the cover 312. The ends of the shaft 309 are positioned within the bushings 306 and 310.

The cover 312 defines a cavity 313 and includes a bore 314 proximate the bottom. The cover 312 is made from a non-ferromagnetic, electrically conductive material such as aluminum. A cylinder 316 is configured and arranged to fit within the cavity 313. The cylinder 316 includes magnets 317 proximate its perimeter and a shaft 318 extending outward from each side. One end of the shaft 318 fits within a bore (not shown) of a cover (not shown) covering the cavity 313. The other end of the shaft 318 extends through the bore 314 of the cover 312 and into a bushing 320 within the bore 305. Between the cylinder 316 and the portion of the shaft 318 within the bushing 320, the shaft 318 includes teeth 319 that mate with the teeth 308 of the drum 307.

A lifeline 325 is operatively connected to the drum 307 by means well known in the art. As tension is placed on the lifeline 325 and the lifeline 325 moves relative to the descender 300, the drum 307 rotates and the cylinder 316 rotates. The magnets 317 of the cylinder 316 interact with the cover 312 and the EMF force provides a braking force on the drum 307 to slow the rate at which the lifeline 325 is paid out. The braking force due to the EMF force generated between the magnets 317 and the cover 312 increases as the rotational velocity increases.

Figure 12:
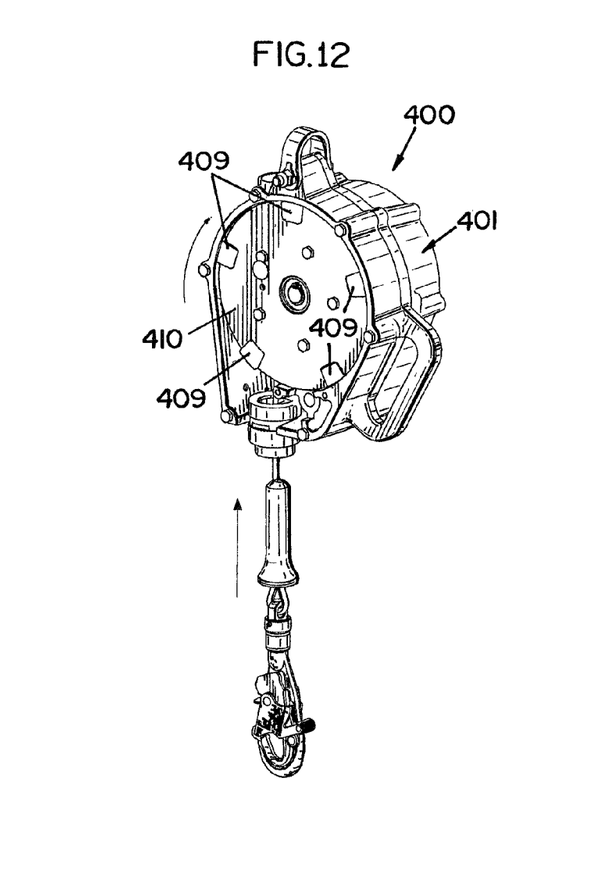
FIG. 12 is a side perspective view of another embodiment self-retracting lifeline constructed according to the principles of the present invention with a cover removed.
Figure 13:
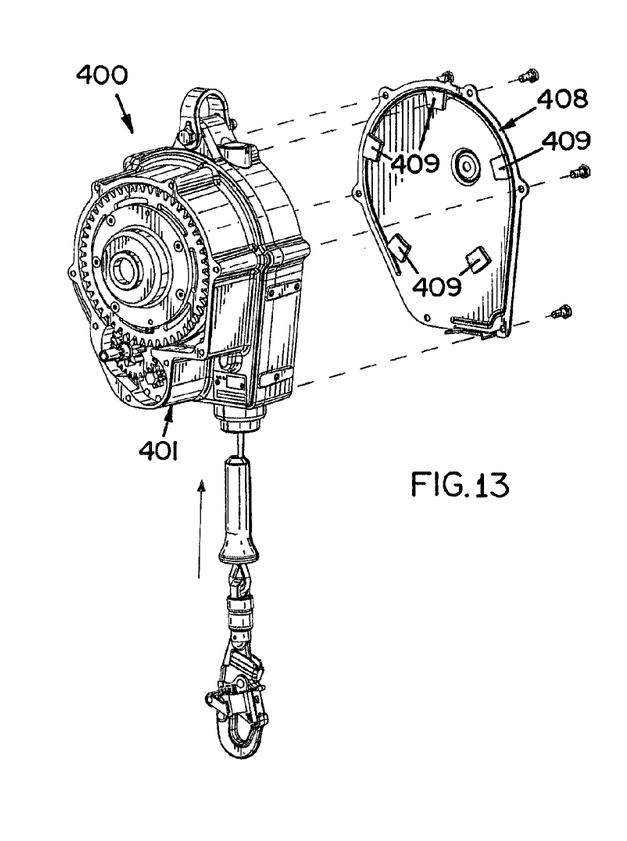
FIG. 13 is a side perspective view of the self-retracting lifeline shown in FIG. 12 with the cover.

An embodiment self-retracting lifeline constructed according to the principles of the present invention is designated by the numeral 400 in FIGS. 12 and 13. The self-retracting lifeline 400 is similar to the self-retracting lifeline 200 and includes an additional feature to assist in reducing the retraction speed of the lifeline. Only the components relevant to this additional feature are being described.

The self-retracting lifeline 400 includes a housing 401, a cover 408, and a drum 410. The cover 408 includes magnets 409. The magnets 409 shown in FIG. 12 show the relative position without the cover 408. The magnets could be operatively connected with epoxy or any other suitable adhesive, a fastener, or other suitable connecting means.

The drum 410 is preferably made from a non-ferromagnetic, electrically conductive material such as aluminum. The magnets 409 are positioned on the cover 408 proximate at least one of the sides as far from the drum 410 rotation axis as possible for the greatest effect or other axis-symmetric component of the drum 410. The faster the drum 410 rotates, the larger the EMF force is on the drum 410 in the opposite direction the drum 410 is rotating. Because the EMF force is in the opposite direction to movement of the drum 410 relative to the magnets 409, a braking force is applied to the drum 410.

Alternatively, the cover 408 could be made from a non-ferromagnetic, electrically conductive material such as aluminum and the drum 410 could have magnets operatively connected to it so that the magnets interact with the cover as the drum rotates. The movement of the magnets on the drum relative to the cover creates an EMF force to assist in slowing the rate at which the drum 410 rotates.

This embodiment could be useful in preventing jamming of a self-retracting lifeline. The pawls of a self-retracting lifeline are commonly held in an unlocked position with springs, and during the retraction of the lifeline into the housing, the pawls will not typically move into a locking position because they typically only move into the locking position when the drum is rotated at a high enough speed in the direction to payout the lifeline. A common problem with self-retracting lifelines is that the pawls can lock at the end of the retraction of the lifeline into the housing if the rotation speed of the drum is high enough and then suddenly stops rotating to cause the pawls to move into a locking position. At the end of the retraction, with a fast spinning drum that suddenly stops, the pawls can be moved into a locking position and will engage the teeth. This causes jamming of the self-retracting lifeline.

For example, this can occur if the snap hook end is released and the lifeline is allowed to retract. Nothing unusual would be noted during the retraction, but because the self-retracting lifeline is jammed, the lifeline could not be pulled out of the housing since at least one of the pawls is in a locking position and engaging the drum as during a fall. Should this occur, repair of the self-retracting lifeline is usually required.

By placing a plurality of magnets proximate the drum (with either the drum including at least one magnet and the cover being at least partially made of a non-ferromagnetic, electrically conductive material such as aluminum or the drum being at least partially made of a non-ferromagnetic, electrically conductive material such as aluminum and the cover including at least one magnet), as the drum rotates faster, the EMF force between the magnets and the non-ferromagnetic, electrically conductive material increases as the drum rotation speed increases. This provides a braking force on the drum to slow it down. By keeping the rotation speed below the speed at which the pawls pivot to move into the locking position, the self-retracting lifeline should not jam.

The above specification, examples, and data provide a complete description of the manufacture and use of the composition of embodiments of the invention. Since many embodiments of the invention can be made without departing from the spirit and scope of the invention, the invention resides in the claims hereinafter appended.

What is claimed is:

1. A fall protection safety device including a braking mechanism, comprising:
    a first component from the group consisting of a rail, a track, and a cable being at least partially made of a non-ferromagnetic and electrically conductive material; and
    a second component configured and arranged to move relative to the first component, the second component including a pawl configured and arranged to pivot from a disengaged position into an engaged position when the second component moves along the first component at a rate greater than a predetermined rate to lock the second component onto the first component, at least one magnet being operatively connected to the pawl, the at least one magnet and the non-ferromagnetic and electrically conductive material of the first component creating an electromagnetic field force when the second component moves at a rate greater than a predetermined rate relative to the first component thereby creating repulsive forces between the at least one magnet and the first component to assist in moving the pawl from the disengaged position into the engaged position.

2. The fall protection safety device of claim 1, wherein the non-ferromagnetic and electrically conductive material is aluminum.

3. The fall protection safety device of claim 1, wherein the second component is a shuttle.

4. The fall protection safety device of claim 3, wherein the second component comprises:
   a housing configured and arranged to move along the first component; and
   the pawl pivotally connected to the housing.

5. A fall protection safety device including a braking mechanism, comprising:
   a housing configured and arranged to move along a support structure, the support structure being from the group consisting of a rail, a track, and a cable and being made of a non-ferromagnetic and electrically conductive material;
   a pawl pivotally connected to the housing and configured and arranged to move from a disengaged position into an engaged position when the housing moves along the support structure at a rate greater than a predetermined rate to lock the housing onto the support structure; and
   a magnet operatively connected to the pawl such that when the housing moves at an increased rate repulsive forces between the magnet and the support structure assist in moving the pawl from the disengaged position into the engaged position.

6. The fall protection safety device of claim 5, wherein the housing is made of aluminum.

* * * * *